Sept. 30, 1952 R. RUMMEL 2,612,444
PRODUCTION OF METALS FROM THEIR ORES
Filed May 12, 1949 2 SHEETS—SHEET 1
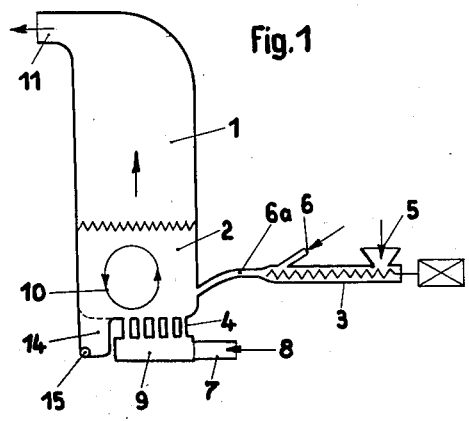
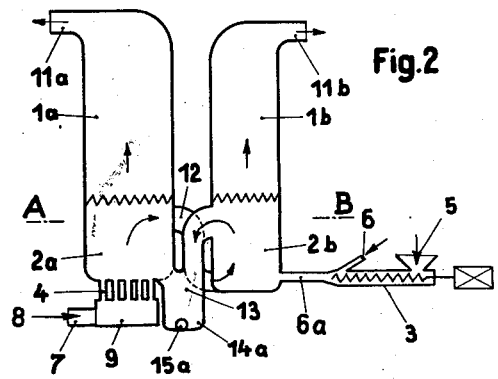
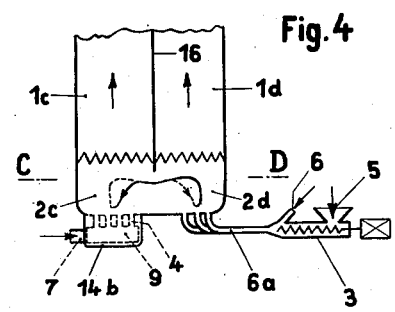
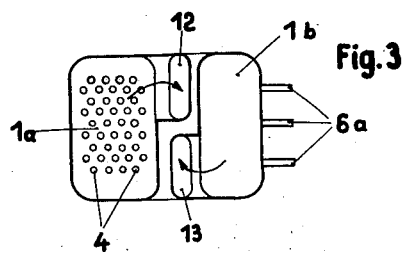
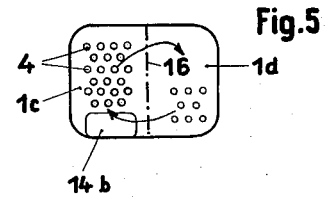
INVENTOR.
Romann Rummel Sept. 30, 1952 R. RUMMEL 2,612,444
PRODUCTION OF METALS FROM THEIR ORES
Filed May 12, 1949 2 SHEETS—SHEET 2

INVENTOR.
Roman Rummel

Patented Sept. 30, 1952

2,612,444

UNITED STATES PATENT OFFICE 2,612,444

PRODUCTION OF METALS FROM THEIR ORES

Roman Rummel, Dusseldorf-Benrath, Germany

Application May 12, 1949, Serial No. 92,833
In Germany December 28, 1948

13 Claims. (Cl. 75—40)

This invention relates to new and useful improvements in the production of metals from their ores.

One object of the invention comprises a new and useful method for the reduction to metal of metal ores and preferably of oxidic ores such as iron ores.

Another object of the invention comprises a new and useful device for carrying out the method in accordance with the invention.

The foregoing and still further objects of the invention may be apparent from the following description read in conjunction with the drawings, in which:

Fig. 1 is a diagrammatic side view representation illustrating one embodiment of the device in accordance with the invention;

Figs. 2, 4 and 6 represent respectively diagrammatic side view representations of alternative embodiments of the device in accordance with the invention;

Fig. 3 shows a diagrammatic cross-section through the construction of Fig. 2 on the plane A—B thereof;

Fig. 5 illustrates a diagrammatic cross-sectional view through the construction shown in Fig. 4 on the plane C—D thereof;

Figure 7:
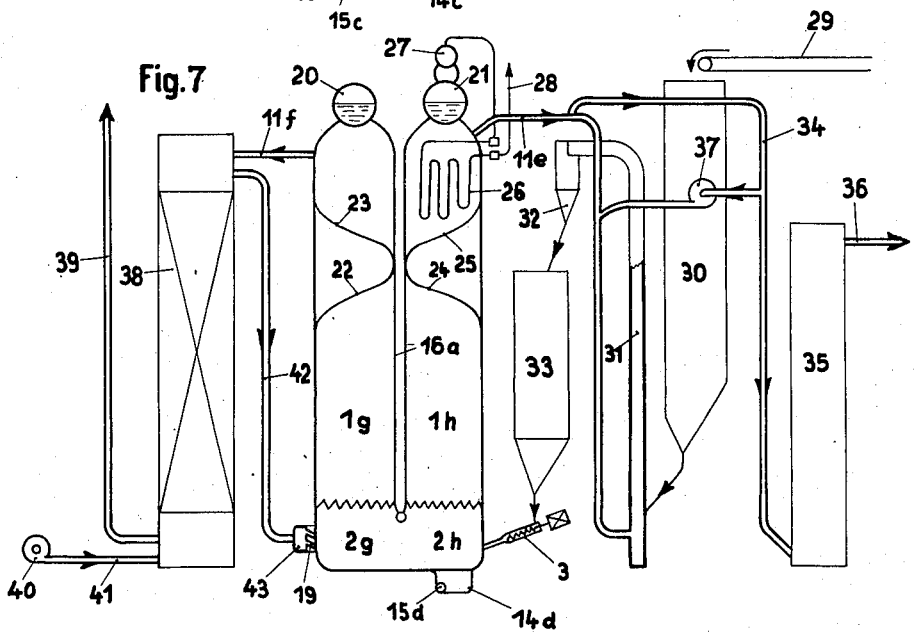
Figure 8:
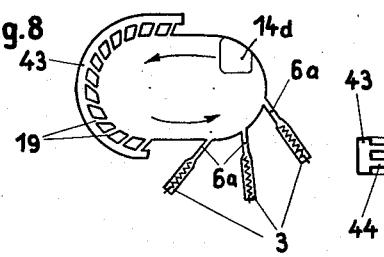
Figures 9, 10:
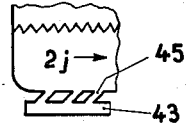

Fig. 7 illustrates a diagrammatic side view representation of a preferred embodiment of the device in accordance with the invention, and showing various ancillary structural arrangements; and Figs. 8, 9 and 10 respectively show diagrammatic cross-sectional representations or parts thereof illustrating alternative means for the introduction of reactants into the device in accordance with the invention.

Within the broad embodiment of the method in accordance with the invention, the ore to be reduced to metal is treated, while in a molten slag, with a reducing agent for the ore and substantially while introducing a combustion supporting gas into the slag.

Within a preferred embodiment of the method in accordance with the invention, the molten slag containing the ore and preferably an oxidic ore such as iron ore is treated with a substantially particled combustible material of the coal type and substantially while introducing a combustion supporting gas into the slag in a direction and with a velocity to cause a substantially cyclic slag current carrying said combustible material along at least part of its way.

A slag useful in accordance with the invention may be any slag comprising mixtures or reaction products of different oxides, the most common and important of which are silica, lime and alumina. Oxide mixtures in the slag may be present as binary or as ternary systems, as well as in the form of various eutetics between different oxides, as is well understood in the art. Slags useful in accordance with the invention may be individually produced, if desired, in accordance with practices conventional in, for instance, metallurgical processes, or, they may be conveniently obtained by way of the slags used in such processes as, for instance, in the reduction to metal of, for example, iron ore. Alternatively, the slag may be obtained, in accordance with my preferred practice, by way of the substantially non-combustible residues of coal products. In that case the slag may be obtained for instance from a coal gasification procedure conducted under conditions of slag formation with the addition of soda ash and lime (if necessary). Most conveniently, however, such slag may be individually prepared by charging a slag reservoir or tub with coal, soda ash and lime in appropriate proportions, as are well understood in the art, and then subjecting the charge to gasification or combustion at high temperatures in the hitherto known manner, to form a molten slag. A convenient source of a coal derived slag is, for instance, one conventionally derived from a coal gasification procedure which has found some industrial application and in which a suitable tower is charged with a combustible material such as coal, soda ash and usually the further addition of lime, and thereupon subjected to the action of a combustion supporting gas such as oxygen and/or air and steam and/or CO. The coal is gasified to form an industrially usable combustible gas and instead of ash or clinker residue which would normally be obtained, a molten slag is formed as a result of the presence of the lime and/or soda ash which converts the relatively high melting residual silica and aluminum compounds of the coal into lower melting products forming the slag which continuously flows from the reaction zone into a suitable slag reservoir. If the particular type of coal used already carries sufficient Ca containing constituents as, for instance, a limey shale, the addition of lime may be omitted.

The reducing agent useful in accordance with the invention for treatment of the molten slag containing the metal ore may be any suitable reducing agent conventionally used for the reduction to metal of metal ores and particularly iron oxide ores, provided, however, that the reducing agent or agents used and participating in the ore to metal reduction substantially tend to create an endothermic balance of reaction. I prefer, however, to add as the reducing agent a substantially solid combustible material of the coal type and preferably in particled form, and for best results a combination of such a particled material and a gaseous reducing agent. In the latter case, the method in accordance with the invention may be advantageously coupled with the production of an industrially valuable combustible gas mixture by introducing an endothermically reacting gasification agent such as water or $CO_2$ and so proportioning the reducing agent and the endothermic gasification reactants that appreciable amounts of $H_2$ and $CO$ are recoverable from the reaction zone, while effectively reducing the metal ore to metal.

Agitation is preferably carried out in the molten slag and particularly when a particled reducing agent such as of the coal type is used. The reduction of metallic ore to metal by carbon is substantially an endothermic reaction, i. e., a reaction which proceeds with absorption of heat. There is then a continuing loss from the molten slag bath of the heat required for reaction. This loss is accentuated when additionally endothermic gasification agents are used for reaction with a particled combustible material of, for instance, the coal type, and proportioned to produce appreciable amounts of a combustible gas mix. Though side reactions of an exothermic nature may occur, the balance of reaction is predominantly endothermic. This heat loss, however, is substantially replenished by the introduction of a combustion supporting gas such as oxygen, air, or oxygen-enriched air, into the molten slag bath. This combustion supporting gas is then preferably introduced into the slag bath at a relatively high velocity so as to impart thereto the necessary agitation and within its preferred application a substantially cyclic motion of or within the slag bath. The combustion supporting gas reacts exothermically with the balance of combustible material such as coal which is distributed in the slag bath to continuously replenish the heat loss occasioned by the endothermic reaction thereby effecting substantial constancy of temperature within the molten slag containing the ore.

The device in accordance with the invention together with several modifications thereof is shown in the drawings, and is described in the following in conjunction with specific applications of my new method.

Referring to Fig. 1, a conventional tower 1 is provided at the bottom thereof with the molten slag reservoir or tub 2. Gas nozzles 4 are provided in eccentric position at the bottom of tub 2 and are supplied by a suitable exothermic reactant such as oxygen, air, or oxygen-enriched air from a source 8 through duct 7 and manifold 9. A suitably driven feeder for combustible material, such as the worm feeder 3, is provided, with its feed end 6a passing into tub 2 on one side thereof and preferably near the bottom. Feeder 3 is provided at one end with hopper opening 5 for feeding particled coal material as, for instance, brown coal, and preferably more or less granular coal, into the feeder 3. A duct 6 entering the feeder 3 at the feed end of the worm is provided for the admission of an endothermically reacting gasifying agent such as steam, $CO_2$, or the like.

Slag reservoir or tub 2 is filled with molten slag. Granular or particled coal such as bituminous coal is fed into the hopper opening 5, being thence transported by feed worm 3 into the molten slag in tub 2. A metal, and preferably oxidic ore such as iron ore, is simultaneously introduced into the molten slag in tub 2, and preferably together with the granular coal. This may be conveniently accomplished by feeding into the hopper opening 5 a mixture of the coal and the ore.

A combustion supporting gas such as oxygen, air, or oxygen-enriched air, is injected with relatively high velocity through nozzles 4 into the molten slag within tub 2. The introduction of the high velocity combustion supporting gas imparts a certain turbulence to the molten slag, and the eccentric position of the nozzle with respect to the bottom of the slag tub 2 imparts at the same time to the slag a circulatory motion as, for instance, indicated by the arrows 10. The metal ore distributes in the slag, the distribution being aided by the turbulence within the slag. At the same time, the particled coal is distributed in the slag and intimately contacted with the distributed iron ore reacting therewith to reduce the same to metal which continuously separates from the molten slag and continuously deposits in a depression or collector reservoir 14 at the bottom of the slag tub, whence it may be withdrawn through drawoff arrangement 15 arranged in the conventional manner for either periodic withdrawal or substantially continuous overflow of the molten metal from the collector reservoir 14.

The iron ore should be preferably relatively particled, in order to facilitate its distribution in the slag bath. A suitable gaseous reducing agent, such as $CO$ or producer gas or the like, may be used if desired and may then be added for instance by way of the duct 6.

It is in most cases desirable to introduce a substantially reactant gas such as an endothermic reactant gas ($CO_2$, steam or the like), or a reducing gas ($CO$, producer gas, or the like), or, otherwise, any suitable substantially inert gas by way of the gas duct 6, in order to aid the introduction of the solid material whether it be ore, coal, or a mixture thereof.

Thus, as shown in Fig. 1, an endothermic gasification reactant such as steam or $CO_2$ may be passed through duct 6, and preferably under pressure, into and through duct 6a thence issuing into the molten slag in tub 2. As illustrated, the endothermically reacting gas thus enters at the feed end of worm feed 3 and aids in the further transport of the combustible material and of the metal ore (assuming these in this case to be introduced as a mixture), passing the same with a certain velocity into the molten slag bath and thus further aiding the distribution of the combustible material therein as well as the distribution of the ore within the slag. The distribution effects are further supported by the turbulence imparted to the molten slag by the injection action of the combustion supporting gas issuing from nozzles 4.

The combustible material as, for instance, coal, as well as the metal ore such as iron ore, may be converted to more or less granular or particled form by the use, for instance, of conventional spike rollers (not shown) and may be introduced either individually or in mixture as the case may be, through the hopper opening 5, with a certain moisture content. This may be the moisture content as it comes from the mines. The moisture content of the materials can be used in this manner to conveniently introduce one of the endothermic reactants. The moisture content may be controlled to any desired predetermined amount by either a preliminary drying operation, or the addition of moisture as may be necessary. If moist materials are used, they further aid in any dissolution and distribution within the molten slag bath as the case may be, since the water content is almost explosively gasified in contact with the molten slag bath at the same time furnishing and finely distributing steam for participation in the endothermic gasification reaction.

If desired, the endothermic gasification reactants including combustible material such as coal, may be advantageously so proportioned that at the same time the gasification reaction results in the formation of appreciable amounts of combustible gases that may be recovered and put to industrial use. It is possible to use the moisture content of the introduced materials as the sole source for the endothermic gasification reactant in which case additional endothermic reactant gas need not be introduced separately such as through duct or ducts 6. However, it is preferred to introduce some gaseous agent through duct 6 to aid the feeding of the combustible material into the slag bath and when it is desired to solely rely upon the moisture content of the combustible material as the source for the endothermic gasification reaction, the gas supplied through duct 6 may then be any other suitable gas, including, if desired, a combustion supporting gas or an inert gas. It is, of course, understood to avoid in such case any gas that might interfere with the desired gasification of the combustible material or may cause the presence of undesirable constituents in the gas mixture passing off through duct 11.

As the molten slag circulates by the impelling force of the high velocity combustion supporting gas issuing through nozzles 4 and as schematically indicated by arrows 10, the finely distributed carbon particles are thus brought into constant recurrent intimate contact with both the endothermic (including metal ore) and the exothermic reactants. The exothermic reactant introduced through nozzles 4, such as oxygen, air, or oxygen-enriched air, causes a combustion with the liberation of heat. The metal ore is reduced to metal by the C, essentially consuming heat in the process. The endothermic reactant gas, such as water vapor (derived for example by way of the moisture content of the combustible material and/or ore) reacts to form with the combustible material $CO$ and $H_2$, essentially consuming heat in this reaction. If $CO_2$ were to be introduced as endothermic gasification reactant, further amounts of $CO$ would be produced. It is then possible to so adjust the amount of combustion supporting gas entering through nozzles 4 that the heat liberated in the exothermic reaction will substantially balance the heat loss incurred in the reducing and gasification reactions, so that the bath of molten slag within tub 2 remains at a substantially uniformly constant temperature.

Among the advantages enjoyed by the procedure in accordance with the invention are the fact that the same lends itself satisfactorily to the use of low grade ores and bituminous materials of the coal type. The combustible material such as coal, whether bituminous or any other type, does not require any particular degree of firmness or compactness, need not be free from fines, and need not possess non-sintering or non-baking characteristics. If a bituminous material, such as soft or brown coal, peat, shale, or the like, is used, the procedure in accordance with the invention permits the gasification reaction to proceed in such manner that a minimum of distillation products, traceable to the bituminous constituents of the material, is found in the recovered combustible gas. Thus, the gasification of bituminous materials can proceed to the recovery of a combustible gas directly usable for most industrial purposes without the necessity of special scrubbing or purifying treatments.

The preferred embodiment of the device in accordance with the invention and as exemplified by a number of variations thereof is shown in Fig. 2, et seq. It is essentially concerned with the simultaneous production of combustible gases in the application of the broad principle of the invention by effecting a separation of the gases resulting respectively from the endothermic and exothermic reaction phases occurring within the molten slag bath.

As for instance illustrated in Fig. 2, there are provided two separate towers 1a and 1b having the gas lead-offs 11a and 11b respectively. A slag reservoir or tub is provided having the sub-portions 2a and 2b respectively. Ducts 12 and 13 interconnect sub-portions 2a and 2b and are preferably so arranged that duct 12 leads from a point just below the surface of the molten slag in the tub at 2a to a point adjacent the bottom of the tub at 2b, and duct 13 leads from a point just below the surface of the molten slag in tub at 2b to a point adjacent the bottom of the tub at 2a. Duct 13 extends at its bottom portion into the molten metal collector reservoir 14a having the draw-off 15a. The bottom of the slag tub portion 2a carries nozzles 4 (see Fig. 3) issuing from manifold 9, fed by duct 7. A multiple number of inlets for the combustible material such as coal and/or ore, and for the gaseous endothermic reactant of the type and arrangement shown and described in connection with Fig. 1 are provided, passing these materials through the ducts 6a into the molten slag within the tub portion 2b and preferably at a point adjacent the bottom thereof.

The introduction of materials into the structure illustrated in Fig. 2 proceeds essentially in the same manner as above illustrated in connection with the device exemplified by Fig. 1. In this case, however, the combustion supporting gas issuing with a relatively high velocity from nozzles 4 into the molten slag in tub portion 2a imparts turbulent agitation to the bath and at the same time a motion in the direction of the arrow, thereby forcing a molten slag current flow into and through duct 12, thence as indicated by the arrows into and through slag tub portion 2b, and thence into and through duct 13 back into slag tub portion 2a. As ore, such as iron ore, and combustible material, such as coal, enter through ducts 6a into the slag in tub portion 2b, the ore is substantially dissolved and the coal is distributed in and picked up by the circulating slag and thusly carried in intimate contact with the ore through duct 13. The reduced metal separates from the slag and accumulates in collector reservoir 14a, while the balance of the coal is carried in the slag current into the tub portion 2a. The gaseous endothermic reactant, such as water, introduced, for instance, by way of the moisture content of the combustible material and/or ore, or, separately introduced in the form of steam, passes through the slag, being intimately contacted therein in tub portion 2b with the ore and combustible material as they are circulated and agitated by the slag current which is set up by the impeller effect of the high velocity combustion supporting gas issuing through the nozzles 4 into tub portion 2a. The gaseous endothermic material reacts endothermically with the combustible material in the tub portion 2b and the gases resulting from that reaction as, for instance, a high grade "water gas," are recovered in the tower 1b by way of the lead-off 11b. These reaction gases also aid the reduction to metal of the ore. The non-gasified portion of the combustible material, such as coal, is carried by the slag current into the tub portion 2a and is there exothermically reacted with the combustion supporting gas such as oxygen, air, or oxygen-enriched air issuing through nozzles 4, thereby replenishing the heat loss incurred by the endothermic reaction within tub portion 2b. The thusly reheated slag (and the balance, if any, of non-gasified combustible and/or ore material) is re-cycled through duct 12 back into tub portion 2b, to be there again charged with combustible material and ore for the endothermic reaction between the combustible matter and the ore and endothermic gas. The reaction gas produced in tub portion 2a is then recovered from the tower 1a by way of the lead-off 11a. Usually the volume of the combustion supporting gas introduced through nozzles 4 is such that combustion proceeds to a large extent to $CO_2$. In that case, particularly when air was used (introducing diluent $N_2$, the gas mixture issuing from tower 1a is too lean in combustible components to be useful for most purposes except for the utilization of its heat. It is, however, possible to so adjust the reaction conditions, including the volume of combustion supporting gas, that a relatively large component of CO is obtained in the gas mix passing from tower 1a, so that a gas of sufficient combustion value is obtained to make its recovery practical for certain limited purposes.

There is thus broadly defined within the preferred embodiment of the invention, as it relates to the simultaneous recovery of a combustible gas mix, the substantially continuous circulation of molten slag through a first and second reaction zone, substantially continuously introducing particled ore, and preferably oxidic ore such as iron ore, and particled combustible material of the coal type into said slag in said first reaction zone, substantially continuously introducing an endothermic gasification reactant for said material into said slag in said first zone, substantially continuously introducing a combustion supporting gas into said slag in said second zone, collecting molten metal separating from said slag, and substantially continuously separately recovering the gaseous products of reaction from at least said first zone.

Figs. 4 and 5 diagrammatically illustrate a variation of the device shown in Figs. 2 and 3. As there exemplified, the slag tub comprises the lower portion of a tower carrying the partition 16 extending to just below the liquid level for the molten slag in the slag tub, and separating the tower into the educt portion 1c above reaction zone 2c and the educt portion 1d above the reaction zone 2d. A multiple number of feed units 3 are provided, the ducts 6a of which enter the bottom of the reaction zone 2d at one side thereof. A molten metal collector reservoir 14b is provided and the nozzles 4 for the combustible gas supplied by way of duct 7 and manifold 9 are arranged at the bottom of the reaction zone 2c at one side thereof and in a position generally about diagonal with respect to the position of the entrance openings of the ducts 6a. The impelling action of the high velocity combustion supporting gas issuing from nozzles 4 will cause molten slag to flow upwards in zone 2c over to and downwards in zone 2d. The introduction of gaseous endothermic reactant, and particularly when accentuated by the introduction under pressure of a gaseous agent by way of duct 6, will cause an upward current of slag in zone 2d over to and downward in zone 2c. In view of the fact that the direction of the current essentially controlled by nozzles 4 and that of the current essentially controlled by the end openings of ducts 6a are not in direct juxtaposition, the injection openings of nozzles 4 and of ducts 6a operate in a manner to form a substantially recycling current, substantially as illustrated by the arrows within the slag tub and shown in Figs. 4 and 5.

Figure 6:
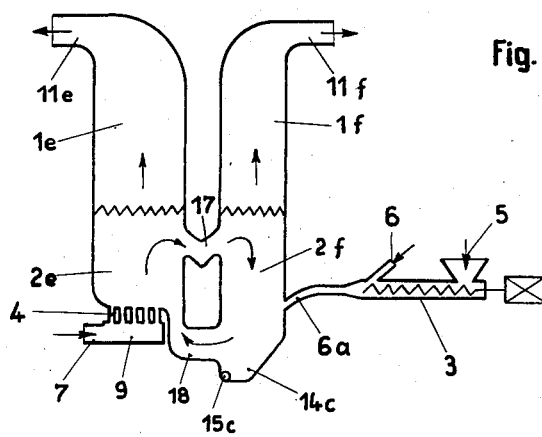

A still further variant in accordance with the preferred embodiment of the invention is, for instance, illustrated in Fig. 6. As there shown, a more or less U-shaped tower is used, having legs 1e and 1f and gas lead-offs 11e and 11f respectively. A partition is provided in the lower portion of the U, separating the same into the reaction zones 2e and 2f, and defining the ducts 17 and 18 respectively between these two zones. The liquid level for the molten slag is provided so as to extend into the respective portions 1e and 1f. The duct 7, manifold 9, and nozzle arrangement 4 (for the combustible gas) are mounted below the reaction zone 2e in a position somewhat higher than the bottom of the U, to provide for a nozzle discharge level above the horizontal portion of the duct 18. A collector reservoir 14c for molten metal and carrying draw-off 15c is provided below reaction zone 2f. Feeding duct or ducts 6a is or are arranged to pass into the reaction zone 2f at a point below the surface of the molten slag, at which point the introduced materials will be seized and carried away by the downwardly directed current. The impelling force of the high velocity combustion supporting gas issuing from nozzles 4 causes the slag to circulate in the direction of the arrows from zone 2e to and through duct 17, thence to and through zone 2f, thence to and through duct 18 and back into zone 2e. Whereas thus in the previously described embodiments exemplifying devices in accordance with the invention, the endothermic reaction is carried out in an upwardly directed stream, Fig. 6 illustrates an embodiment where such reaction is accomplished while the combustible material is passed through the endothermic reaction zone in a downwardly directed stream, which is particularly advantageous in the reduction to metal of many oxide ores and especially iron oxide ores.

The device shown in Figs. 7 and 8 exemplifies a further preferred practice and structure in accordance with the invention effectively utilizing the heat of the produced gases for the pre-heating of the gasifying agents, generation of steam, and pre-drying of, for instance, the combustible material. There is also illustrated in Fig. 7 a still further variant with respect to the circulation arrangement for the molten slag bath in that, in this case, the combustion supporting gas nozzles and entry ducts for the ore, combustible material and endothermic reactant are so arranged that a substantially horizontal circulatory motion of the molten slag is obtained.

A tower is separated by the partition 16a into the portions 1g and 1h. A slag tub is arranged at the bottom of the tower, and the partition 16a extending to below the level of the molten slag within the tub, defines the reaction zones 2g and 2h. Iron oxide ore mixed with combustible material such as coal is fed into reaction zone 2h by way of the worm feeds 3. If desired, though usually not as advantageous, the ore and coal may be introduced separately by using at least one of the worm feeds for one and the balance of the feeds for the other of these two materials. Combustion supporting gas is blown into the molten slag in zone 2g by way of the nozzles 19 connected to manifold 43 supplied by duct 42. Nozzles 19 and the feed ducts 6a of worm feeds 3 enter their respective reaction zones in a downwardly inclined position, being at the same time inclined sidewise with respect to the movement of the molten slag as indicated by the arrows in Fig. 8. In this manner, a very effective intimate mixture of combustible material, slag, and gasification agents, is at all times assured. Tower 1h carries within the walls thereof suitable cooling means such as water pipes (not shown), which end in water drum-tanks 20 and 21. Cooling racks having water cooling pipes are diagonally secured in the upper tower portions. These are, for instance, diagrammatically indicated by the racks 22 and 23 in the tower portion 1g, and the racks 24 and 25 in the tower portion 1h. These cooling racks serve the purpose of liquefying or solidifying portions of slag that may be propelled upwardly along with the reaction gases.

One end of the cooling pipes for each pair of racks 22—23 and 24—25 is attached to a source of water supply and preferably to the water tank drums 20 and 21 containing pre-heated water resulting from the cooling pipe system built into the walls of the tower portions 1g and 1h. The other end of the cooling pipes of the set 24—25 feeds into the super-heater 26. The effect of the hot gases passing the cooling racks is to convert the water therein into steam, which passes into the super-heater 26, in which it is superheated by the passage of the hot reaction gases in tower portion 1h. Super-heater 26 is connected with the steam reservoir 27 and has the steam draw-off duct 28, whence super-heated steam may be passed off to any industrial usage.

Coal, of either the "hard" type and including coke or the like, or, of the "soft" or "bituminous" type such as brown coal, is for instance suitably broken into particles by the use of a conventional spiked roller arrangement (not shown), and is then continuously carried by the endless band 29 into silo 30 whence it passes into the drying duct 31. The pre-cooled but still hot reaction gases, drawn off the top of tower portion 1h by way of duct 11e, pass into the bottom of the drying column 31 in which they carry the particled coal upwardly in a stream or current of gas, at the same time drying the same to a predetermined moisture content. The gas and particled coal pass into the dust separator 32 in which the gas is freed of coal dust, being thereafter passed through duct 34 into and through washer 35 and thence out through duct 36, being now ready for industrial use. Blower 37 is provided to draw any portion of the cooled gas passing through duct 34 into the hot gas passing through duct 11e to the bottom of drying column 31. In this manner, the temperature of the gas for drying and transporting the particled coal upwardly in drying column 31 can be adjusted to obtain for the coal the desired predetermined moisture content. The coal is then passed from separator 32 into the mixing hopper 33 in which it is mixed with particled ore such as iron ore, the mixing being thence fed by way of the worm feeds 3 into the reaction zone 2h. The substantially continuously separating metal collects in collector reservoir 14d whence it may be withdrawn continuously or periodically by way of draw-off 15d.

The reaction gases, cooled by the cooling racks 22, 23, are passed from tower 1g by way of duct 11f into a suitable heat exchanger 38. Such heat exchanger may be conventionally provided, for instance, with a multiple series of cooling racks and are usually arranged in pairs so that one of the heat exchangers can receive the hot gas to be cooled (hot blowing), while the other, having previously received such hot gas, now receives a cooled gas (cold blowing) to impart thereto, by heat exchange, the temperature of the racks. In the illustration of Fig. 7 only one of such pair of heat exchangers is illustrated. Assuming that the racks of heat exchanger 38 have been hot blown and the reaction gases passing out through duct 11f are now being cooled in heat exchange relation in a second re-generator (not shown), the air pump 40 blows air through duct 41 into the heat exchanger 38, thereby preheating the same in heat exchange relation with the previously hot blown (from the reaction gases of tower portion 1g) racks of the exchanger. This preheated air is then passed through duct 42 into manifold 43 and by way of the nozzles 19 into the reaction zone 2g.

The gas issuing from duct 36 is substantially free from undesirable impurities, it is free of steam and coal dust, and can be passed off directly to the intended industrial use. In the particular embodiment shown in Fig. 7, the amount of air introduced by way of nozzles 19 is preferably such that the combustible material circulated within the molten slag in reaction zone 2g is substantially completely combusted, and the gas conducted through the heat exchanger is passed out of the exchanger by way of duct 39 leading to chimney elimination.

As is apparent from the foregoing, the novel device in accordance with the invention for the improved reduction to metal of metal ores essentially comprises within the broad concept thereof means defining a molten slag reservoir, nozzle means for introducing high velocity combustion supporting gas into said reservoir, said nozzle means being positioned and arranged to impart to molten slag in said reservoir a substantially cycling motion, means for introducing substantially particled ore such as iron ore into said reservoir, means for introducing a reducing agent for said ore and preferably a particled combustible material such as coal into said reservoir, and means at the bottom of said reservoir positioned to collect molten metal separating from the molten slag in said reservoir.

As will be further apparent from the foregoing, the preferred device in accordance with the invention for the reduction to metal of metal ores, and capable of serving at the same time the production of industrially valuable combustible gases, additionally includes within the broad concept thereof means for introducing into said reservoir a gaseous endothermic gasification reactant for combustible material of, for instance, the coal type, and means for recovering gaseous reaction products from said reservoir.

As is still further apparent from the foregoing, a preferred device in accordance with the invention may essentially comprise means defining a first slag reservoir reaction zone and a second slag reservoir reaction zone, nozzle means for introducing high velocity combustion supporting gas into one of said reaction zones, said nozzle means being positioned and arranged to impart to molten slag in said reaction zone a molten slag current substantially over to, through, and back from the other reaction zone in substantially a cycling motion, means for introducing particled ore and combustible material and gaseous gasification reactant for said combustible material into said other reaction zone, means for collecting molten metal separating from the slag in at least said other reaction zone, and means for separately recovering at least the reaction gases produced in said other reaction zone.

It will be generally understood that it is desirable that the path of travel for the reactants through the molten slag is preferably so dimensioned and the introduction of materials so related thereto, that at least the gasification reactions between the combustible material and the gasification agents are essentially completed at the end of about one cycle along the path of travel of the combustible agent. It is, however, well within the skill of any competent engineer to appropriately correlate to this end the velocity of the gasification agents entering the molten slag bath, the height and/or volume of the slag bath, as well as its horizontal dimensions.

Further variations in combustion supporting gas nozzle arrangements are, for instance, illustrated in Figs. 9 and 10. As shown for example in Fig. 9, the nozzles 44 supplied by the manifold 43 are substantially horizontally disposed to propel high velocity combustion supporting gas in a substantially horizontal direction into the slag reservoir or tub 2i. The horizontal angular disposition of these nozzles 44, however, is substantially similar to that of the nozzles 19 illustrated in Fig. 8 to thereby set up a substantially horizontal circulatory movement of the slag within the reservoir 2i, and continue the impelling of the circulatory slag current thereby created. The nozzles 45 of Fig. 10 supplied by manifold 43 are arranged at the bottom of the molten slag tub 2j and are mounted to issue the high velocity combustion supporting gas at an angle to the vertical, to thereby impart current movement to the slag bath substantially in the direction of the arrow.

It is understood that when proceeding in accordance with the invention, additional molten slag is continuously formed as part of the gasification reaction of the introduced combustible material and the reduction to metal of the ore. There should, therefore, be preferably provided either conventional overflow arrangements for the purpose of continuously withdrawing excess molten slag, or, alternatively, conventional means should be provided for a periodic withdrawal of such excess slag. The excess slag itself, with or without additives, may be used for the formation, such as by casting or molding, of building blocks or similar materials.

It may also be desirable from time to time, or, continuously (as conditions may require) to add suitable slagging additives for appropriate slag conversion of the alumina and silica constituents continuously introduced by the combustible material and/or ore.

The additives may also include materials as may be desired or necessary for scrubbing, purifying, alloying or other conventional purposes. The additives may be added in any convenient manner such as by intermixture with the ore or the combustible material, or both.

It is understood within the broad concept of this invention that the same may generally serve the reduction to metal of any suitable ore normally and conventionally reducible to metal by carbon at elevated temperatures as is well understood in the art. The invention is particularly suitable in its application to iron and/or manganese oxides bearing ores. The same, however, finds its most advantageous application within my preferred concept thereof to what are generically termed iron oxide ores. Depending upon various factors well understood in the art, and including temperature of the slag, composition of a particular ore or a particular slag used, and relative concentration of ore in relation to the slag, the ore may be substantially entirely dissolved or partly dissolved and partly dispersed in the slag. The reducing reaction, however, will take place irrespective of whether the ore is in substantially dissolved or dispersed state within the slag.

A certain control over the ore reduction to metal, and undesirable side reactions with some of the ore constituents, may be controlled to some extent in the application of my invention. Thus, for instance, when treating iron ores for the production of raw iron in accordance with the invention, a certain control may be effected over the reduction to the element or the re-oxidation of the reduced element derived from such normally present components of iron ores as manganese oxides, silica, phosphor oxides, etc. In this manner, a raw metal and particularly a raw iron may be obtained from the collector reservoir which is, to some extent, purer in undesirable constituents of, for instance, Mn, Si, or P, thereby permitting subsequent purification or scrubbing to be substantially reduced in extent and/or simplified. In fact, for many purposes, the metal obtained may be useful directly as such by reason of its lower content of these impurities normally materially affecting its characteristics, as is well understood.

Wherever the expression "material of the coal type" or a term of similar import is used herein, in connection with the reduction to metal of ore and/or the gasification of such a material, it is intended to designate thereby any material containing carbon and irrespective of whether such material is in its natural state, refined, semi-refined, otherwise treated, or artifically produced, and including specifically any and all grades and types of hard and soft coals, peats, shales, carbon-containing tars, other carbon-containing materials irrespective of the specific modification or structure of the carbon therein, as well as all coke products and whether of hard coal, bituminous coal or other origin.

I claim:

1. In the reduction to metal of ores, the improvement comprising substantially continuously introducing a particled ore into a molten slag, substantially continuously contacting said ore in said slag with a reducing agent for said ore, substantially continuously introducing a combustion supporting gas into said slag, and collecting metal separating from said slag.

2. Improvement according to claim 1 in which said ore in said slag is substantially continuously contacted with a particled reducing agent of the coal type.

3. Improvement according to claim 2 in which said slag is substantially continuously moved in a substantially cyclic current.

4. Improvement according to claim 3 in which said combustion supporting gas is substantially continuously introduced into said slag in a direction and with a velocity sufficient to thereby cause said slag to move in a substantially cyclic current.

5. Improvement according to claim 4 in which said ore is a particled iron ore.

6. Improvement according to claim 5 in which said particled iron ore and said particled reducing agent are substantially continuously introduced into said slag as a pre-formed mixture.

7. In the reduction to metal of ores, the improvement comprising substantially continuously introducing a particled ore and particled combustible material of the coal type into a molten slag, substantially continuously introducing into said slag a combustion supporting gas in a direction and with a velocity sufficient to thereby cause said slag to move in a substantially cyclic current substantially continuously introducing into said current an endothermic gasification reactant for said combustible material, collecting metal separating from said slag and recovering a combustible gas from above said slag.

8. Improvement according to claim 7 in which said ore, said combustible material and said endothermic reactant are substantially continuously introduced into and reacted in a first portion of said slag current defining a first reaction zone, in which said combustion supporting gas is substantially continuously introduced into and substantially exothermically reacted with remaining combustible material in a subsequent portion of said slag current defining a second reaction zone, and in which there is separately recovered a combustible gas from said first zone.

9. Improvement according to claim 8 in which at least a portion of said endothermic reactant is substantially continuously introduced as a gas into said slag in a direction and with a velocity sufficient to co-act with said combustion supporting gas in substantially maintaining such cyclic current.

10. Improvement according to claim 8 in which said particled iron ore and said particled combustible material are substantially continuously introduced into said slag as a pre-formed mixture and substantially in and with a carrier gas substantially continuously entering said slag in a direction and with a velocity sufficient to co-act with said combustion supporting gas in substantially maintaining such cyclic current.

11. Improvement according to claim 10, in which said ore is iron ore, in which said carrier gas is an endothermic reactant gas supplying a portion of said endothermic reactant, and in which the remainder of said endothermic reactant is $H_2O$ introduced by way of moisture content of at least one of said ore and said combustible material.

12. In the method for the recovery of metals from ores the improvement which comprises continuously introducing a particled combustible into a molten slag containing such ore for the reduction of the ore, substantially continuously introducing a combustion supporting gas into said slag for reaction with the remaining residue of said particled combustible, and collecting metal separating from said slag.

13. In the method for the recovery of pig iron from iron ores, the improvement which comprises substantially continuously contacting such iron ore with a particled combustible in a molten slag for the reduction of the iron ore, continuously introducing a combustion supporting gas into said slag for reacting with the remaining residues of said particled combustible, and collecting iron metal separating from said slag.

ROMAN RUMMEL.

REFERENCES CITED

The following references are of record in the file of this patent:

UNITED STATES PATENTS

| Number | Name | Date |
|---|---|---|
| 350,574 | Wainwright | Oct. 12, 1886 |
| 404,159 | Bookwalter | May 28, 1889 |
| 411,417 | Bookwalter | Sept. 24, 1889 |
| 801,500 | Young | Oct. 10, 1905 |
| 895,513 | Thwaite et al. | Aug. 11, 1908 |
| 904,263 | Kaiser | Nov. 17, 1908 |
| 1,031,490 | Thomson | July 2, 1912 |
| 1,255,191 | McDonald | Feb. 5, 1918 |
| 1,313,309 | Mambourg | Aug. 19, 1919 |
| 1,319,061 | Garred | Oct. 21, 1919 |
| 1,559,622 | Klotzer | Nov. 3, 1925 |
| 1,592,861 | Leonarz | July 20, 1926 |
| 1,592,862 | Leonarz | July 20, 1926 |
| 1,592,863 | Leonarz | July 20, 1926 |
| 1,689,734 | Lovez | Oct. 30, 1928 |
| 2,111,579 | Winkler | Mar. 22, 1938 |